United States Patent
Suzuki et al.

(10) Patent No.: US 9,827,857 B2
(45) Date of Patent: Nov. 28, 2017

(54) POWER SUPPLY DEVICE

(71) Applicant: Toyota Jidosha Kabushiki Kaisha, Toyota-shi Aichi-ken (JP)

(72) Inventors: Kota Suzuki, Toyota (JP); Tomoko Oba, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 55 days.

(21) Appl. No.: 15/058,280

(22) Filed: Mar. 2, 2016

(65) Prior Publication Data
US 2016/0257207 A1 Sep. 8, 2016

(30) Foreign Application Priority Data
Mar. 2, 2015 (JP) .................. 2015-039919

(51) Int. Cl.
| | |
|---|---|
| *B60L 11/02* | (2006.01) |
| *B60L 11/18* | (2006.01) |
| *H02M 3/04* | (2006.01) |
| *H02M 7/44* | (2006.01) |
| *H02M 1/32* | (2007.01) |
| *H02P 27/06* | (2006.01) |

(Continued)

(52) U.S. Cl.
CPC ............... *B60L 11/02* (2013.01); *B60L 11/18* (2013.01); *H02M 1/32* (2013.01); *H02M 3/04* (2013.01); *H02M 7/44* (2013.01); *H02M 7/5387* (2013.01); *H02M 2001/007* (2013.01); *H02M 2001/008* (2013.01); *H02M 2001/325* (2013.01); *H02P 27/06* (2013.01)

(58) Field of Classification Search
CPC ........... B60L 11/02; B60L 11/18; H02M 7/44; H02M 3/04
USPC ................................. 307/9.1, 10.1
See application file for complete search history.

(56) References Cited

U.S. PATENT DOCUMENTS

| | | | |
|---|---|---|---|
| 2009/0224720 A1* | 9/2009 | Oyobe .................... | B60L 11/18 318/801 |
| 2010/0244558 A1* | 9/2010 | Mitsutani ............... | B60K 6/365 307/9.1 |

(Continued)

FOREIGN PATENT DOCUMENTS

| | | |
|---|---|---|
| JP | 2007-252134 A | 9/2007 |
| JP | 2009-201195 A | 9/2009 |

*Primary Examiner* — Daniel Kessie
(74) *Attorney, Agent, or Firm* — Dinsmore & Shohl LLP

(57) ABSTRACT

A power supply device includes a battery, an inverter, a converter, an electronic control unit. The inverter includes an upper arm having a third switching element and a lower arm having a fourth switching element. The converter includes an upper arm having a first switching element and a lower arm having a second switching element. The electronic control unit is configured to, when a state where the primary-side voltage is at least equal to the specified threshold continues for a specified time or longer, i) increase the primary-side voltage by repeatedly switching the second switching element between ON and OFF state while maintaining the first switching element to be OFF state, and apply the increased voltage as the secondary-side voltage to the inverter, and ii) convert the secondary-side voltage to the AC voltage by repeatedly switching each of the third and the fourth switching element between ON and OFF state.

6 Claims, 3 Drawing Sheets

(51) Int. Cl.
*H02M 7/5387* (2007.01)
*H02M 1/00* (2006.01)

(56) References Cited

U.S. PATENT DOCUMENTS

| | | | | |
|---|---|---|---|---|
| 2012/0081045 A1* | 4/2012 | Takamatsu | ............... | B60L 3/003 |
| | | | | 318/400.3 |
| 2014/0111120 A1* | 4/2014 | Mitsutani | ................ | B60L 11/18 |
| | | | | 318/139 |
| 2015/0321574 A1* | 11/2015 | Oi | ......................... | B60L 3/0007 |
| | | | | 307/10.1 |

* cited by examiner

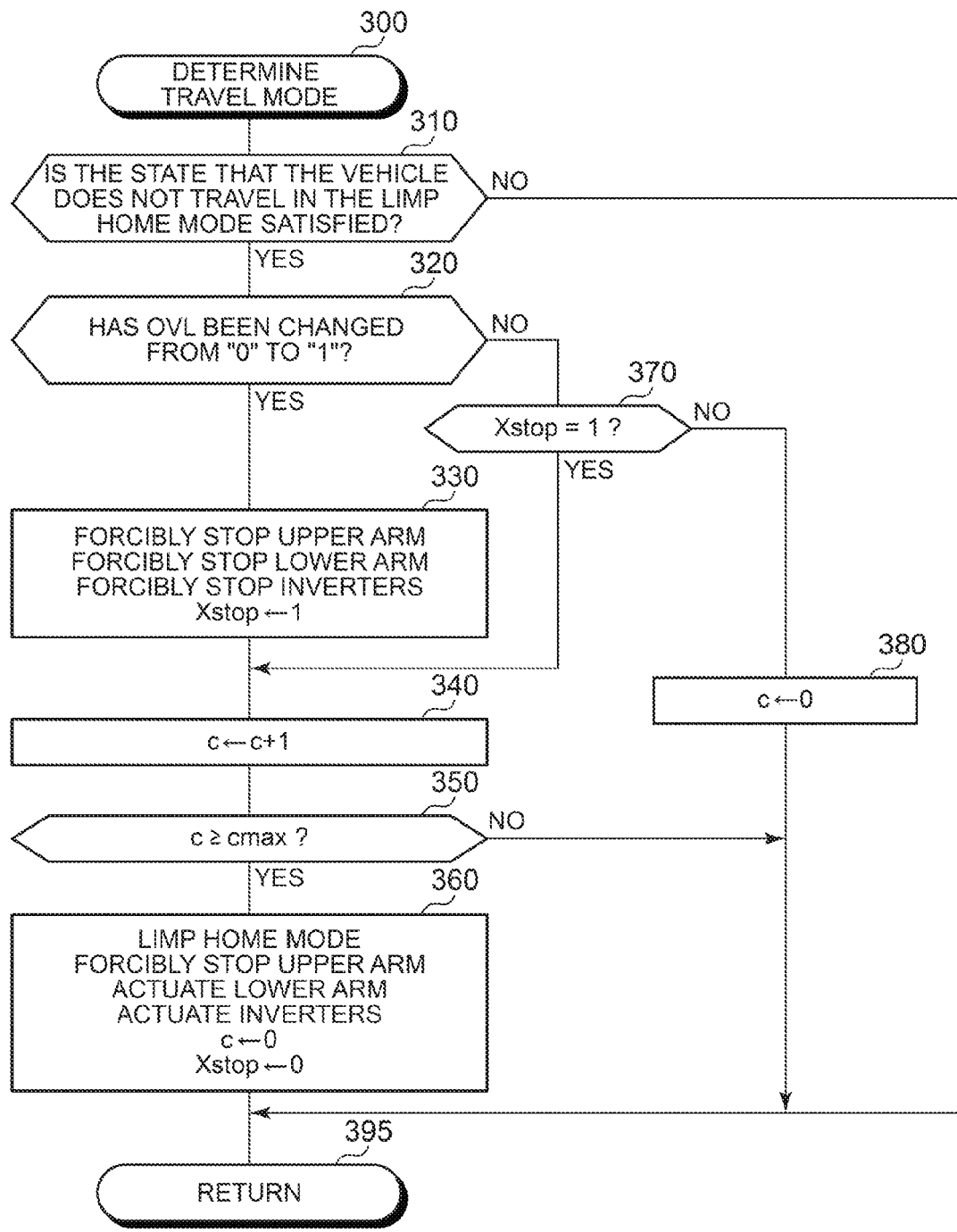

POWER SUPPLY DEVICE

INCORPORATION BY REFERENCE

The disclosure of Japanese Patent Application No. 2015-039919 filed on Mar. 2, 2015 including the specification, drawings and abstract is incorporated herein by reference in its entirety.

BACKGROUND

1. Technical Field

The present specification relates to a power supply device that is applied to a vehicle in which a generator motor is mounted as a drive source for generating drive power of the vehicle and that includes a battery capable of charging and discharging, a converter, and an inverter.

2. Description of Related Art

In a power supply device that includes a converter and an inverter, each of which is configured by including a switching element, there is a case where an overvoltage as a voltage that is at least equal to a specified threshold is generated in a primary-side voltage (a low-voltage-side voltage) and/or a secondary-side voltage (a high-voltage-side voltage) of the power supply device. A power supply device for executing protection control in which each of the switching elements of the converter and the inverter is forcibly stopped (hereinafter also referred to as "shut down") so as to prevent equipment breakdown inside and outside of the power supply device at a time when the overvoltage is generated has been known. This converter has: an upper arm that includes the switching element; and a lower arm that is connected to the upper arm in series and includes the switching element, increases the primary-side voltage applied from a battery by switching the switching element of the lower arm, and applies the increased voltage as the secondary-side voltage to the inverter. In addition, this converter lowers the secondary-side voltage by switching the switching element of the upper arm and applies the lowered voltage as the primary-side voltage to the battery.

When each of the switching elements of the converter and the inverter is shut down by the above protection control, the secondary-side voltage of the power supply device is lowered due to power consumption by discharge resistance in a high-pressure-side circuit (a circuit operated by the secondary-side voltage). Alternatively, the primary-side voltage of the power supply device is lowered due to power consumption by auxiliary machines that are connected to a low-voltage-side circuit (a circuit operated by the primary-side voltage).

In view of the above, in one of conventional power supply devices (hereinafter referred to as a "conventional device"), in the case where the above secondary-side voltage and/or the above primary-side voltage is lowered and it is determined that states of the power supply device, peripheral circuits, and the like allow a vehicle to travel in a limp home mode, each of the switching elements of the converter is shut down. In this way, the vehicle travels in the limp home mode only by power discharged from the battery.

Furthermore, in a case of failure of an overvoltage determination circuit that determines whether the overvoltage is generated in the converter, an overvoltage signal indicating that the primary-side voltage has exceeded the specified threshold is occasionally generated. Also, in this case, similar to a time when the overvoltage is generated, the conventional device shuts down each of the switching elements of the converter and the inverter. Thereafter, if it is determined that the vehicle is allowed to travel in the limp home mode, the vehicle travels in the limp home mode only by power discharged from the battery.

By utilizing this method, the conventional device directly applies a DC voltage that is output from the battery to the inverter without increasing the voltage. Furthermore, the conventional device causes the inverter to convert this DC voltage to an AC voltage, drives a generator motor, and allows the vehicle to travel in the limp home mode by which the vehicle can move to a safe place (for example, see Japanese Patent Application Publication No. 2009-201195 (JP 2009-201195 A)).

However, the inverter is operated by the voltage (the voltage of the battery) that is not increased by the converter during the above limp home mode travel of the vehicle. Accordingly, the AC voltage output by the inverter is lower than that during normal travel. Thus, the conventional device may not be able to obtain sufficient drive power by the generator motor during the limp home mode travel.

SUMMARY

The present specification provides a power supply device that allows the limp home mode travel of a vehicle by utilizing high drive power when an overvoltage is generated in the power supply device.

A power supply device related to the present specification is applied to a vehicle in which a generator motor is mounted as a drive source for generating drive power of the vehicle. The power supply device includes a battery, an inverter, a converter, an overvoltage determination circuit, and an electronic control unit. The battery can be charged and discharged. The inverter has a plurality of legs, each of which includes an upper arm having a third switching element and a lower arm connected to the upper arm in series and having a fourth switching element. The inverter performs a DC-AC converting operation that converts a secondary-side voltage to an AC voltage and applying the AC voltage to the generator motor when a state of each of the third switching element and the fourth switching element is repeatedly switched between an ON state and an OFF state. The converter includes an upper arm having a first switching element and a lower arm connected to the upper arm in series and having a second switching element. The converter performs a voltage converting operation that increases a primary-side voltage to be applied to the converter from the battery and applying the increased voltage as the secondary-side voltage to the inverter when a state of the second switching element is repeatedly switched between an ON state and an OFF state. The overvoltage determination circuit determines whether the primary-side voltage is at least equal to a specified threshold. The electronic control unit is configured to cause the converter to perform the voltage converting operation and cause the inverter to perform the DC-AC converting operation. The electronic control unit is configured to maintain the states of all of the first switching element, the second switching element, the third switching element, and the fourth switching element to be the OFF state when the overvoltage determination circuit determines that the primary-side voltage becomes at least equal to the specified threshold. The electronic control unit is configured to, when the overvoltage determination circuit determines that a state where the primary-side voltage is at least equal to the specified threshold continues for a specified time or longer, i) increase the primary-side voltage by repeatedly switching the state of the second switching element between the ON state and the OFF state while maintaining the state of the first switching element to be the OFF state, and apply the increased voltage as the secondary-side voltage to the inverter, and ii) convert the secondary-side voltage to the AC voltage by repeatedly switching each of the states of the third switching element and the fourth switching element between the ON state and the OFF state, and apply the AC voltage to the generator motor.

BRIEF DESCRIPTION OF THE DRAWINGS

Features, advantages, and technical and industrial significance of exemplary embodiments of the present specification will be described below with reference to the accompanying drawings, in which like numerals denote like elements, and wherein:

FIG. 3 is a flowchart of a "travel mode determination routine" by the power supply device according to the embodiment.

DETAILED DESCRIPTION OF EMBODIMENTS

A description will hereinafter be made on a "power supply device" according to an embodiment of the present specification with reference to the drawings. The "power supply device" according to this embodiment is applied to a hybrid vehicle. However, this embodiment can also be applied to a vehicle that has a generator motor as a generation source (a drive source) of vehicle drive power.

Figure 1:
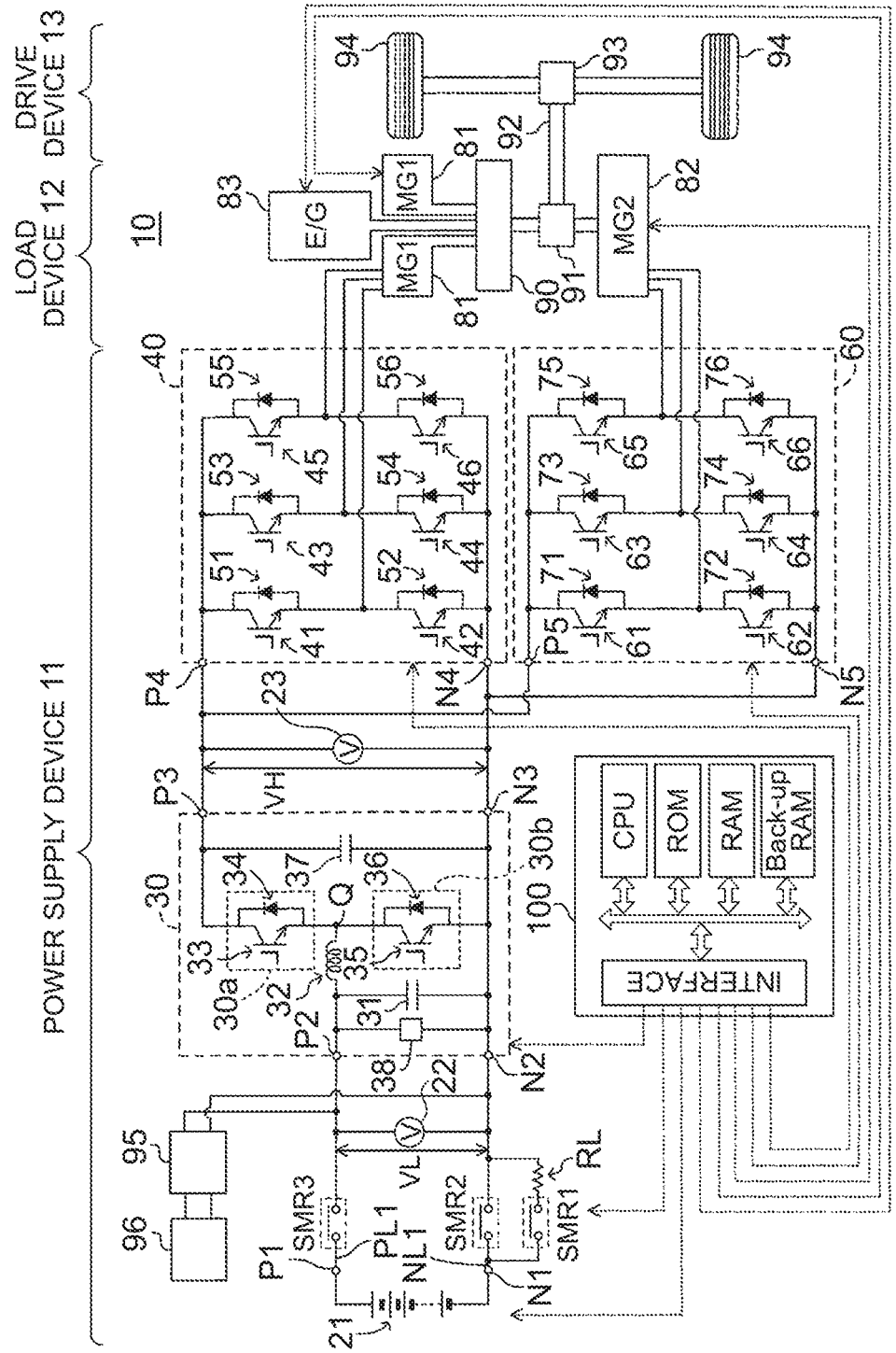
FIG. 1 is a schematic configuration view of a vehicle to which a "power supply device" according to an embodiment of the present specification is applied.

As shown in FIG. 1, a hybrid vehicle (hereinafter also referred to as a "vehicle") 10 includes a power supply device 11 according to the embodiment of the present specification, a load device 12, a drive device 13, and the like.

The power supply device 11 includes a battery 21, a first voltage sensor 22, a second voltage sensor 23, a converter 30, a first inverter 40, a second inverter 60, and system main relays SMR1, SMR2, and SMR3.

The load device 12 includes a first generator motor 81, a second generator motor 82, and an internal combustion engine 83.

The drive device 13 includes a power split mechanism 90, a reduction mechanism 91, an axle 92, a differential gear 93, and drive wheels 94.

The battery 21 is formed by combining a plurality of secondary batteries that can be charged and discharged. The secondary battery of this embodiment is a lithium-ion battery; however, the secondary battery may be a nickel hydrogen battery or another type of the secondary battery. A positive electrode terminal (P1) of the battery 21 and a negative electrode terminal (N1) of the battery 21 are respectively connected to ends of paired feeder lines (PL1, NL1). The other ends of the paired feeder lines (PL1, NL1) are respectively connected to paired low-pressure-side terminals (P2, N2) of the converter 30.

The system main relays (hereinafter referred to as "relays") SMR1, SMR2, and SMR3 are each a device that connects or disconnects a circuit between the battery 21 and the converter 30 in an interlocking manner with a "power switch of the vehicle 10", which is not shown. The relay SMR1 is connected between the terminal N1 and an end of a resistor RL. The relay SMR2 is connected between the terminal N1 and the terminal N2. The relay SMR3 is connected between the terminal P1 and the terminal P2. The relays SMR1, SMR2, and SMR3 are each opened or closed by a signal from an electronic control unit (hereinafter referred to as a "ECU") 100.

The converter 30 includes the above-described paired low-pressure-side terminals (P2, N2), paired high-pressure-side terminals (P3, N3), and a voltage conversion section. In this specification, a voltage between the paired low-pressure-side terminals (P2, N2) is referred to as a primary-side voltage VL, and a voltage between the paired high-pressure-side terminals (P3, N3) is referred to as a secondary-side voltage VH. The voltage conversion section can convert the primary-side voltage VL to the secondary-side voltage VH and vice versa.

The voltage conversion section of the converter 30 includes a capacitor 31, a reactor 32, a first insulated-gate bipolar transistor (IGBT) 33, a diode 34, a second insulated-gate bipolar transistor (second IGBT) 35, a diode 36, a capacitor 37, and an overvoltage determination circuit 38.

The capacitor 31 is inserted between paired power lines that respectively are connected to the paired feeder lines (PL1, NL1) on the high-pressure-side terminals (P3, N3) side from the relays SMR1, SMR2, and SMR3. The capacitor 31 smoothes the primary-side voltage VL. The reactor 32 is inserted in series in a power line that is connected to the feeder line PL1 on the high-pressure-side terminals (P3, N3) side from the capacitor 31.

The diode 34 is connected to the first IGBT 33 in antiparallel, and the diode 36 is connected to the second IGBT 35 in antiparallel. The first IGBT 33 and the second IGBT 35 are connected to each other in series such that an anode of the diode 34 and a cathode of the diode 36 are connected at an intermediate connection point Q, and are inserted between the paired high-pressure-side terminals (P3, N3). The reactor 32 is connected to this intermediate connection point Q.

A circuit that is constructed of the first IGBT 33 and the diode 34 is referred to as an upper arm 30a. A circuit that is constructed of the second IGBT 35 and the diode 36 is referred to as a lower arm 30b. That is, the upper arm 30a and the lower arm 30b are connected in series. The capacitor 37 is inserted between the paired high-pressure-side terminals (P3, N3). The capacitor 37 smoothes the secondary-side voltage VH.

The overvoltage determination circuit 38 is inserted between the paired low-pressure-side terminals (P2, N2). An overvoltage signal outputs an OVL signal. The overvoltage determination circuit 38 outputs "1" as the OVL signal when it is determined that a voltage (the primary-side voltage VL) between (P2, N2) is at least equal to a specified threshold Vth, and outputs "0" as the OVL signal when it is determined that the primary-side voltage VL is lower than Vth.

The converter 30 executes a voltage lowering operation that converts the secondary-side voltage VH to the primary-side voltage VL when the first IGBT 33 is switched (repeatedly switched between an ON state and an OFF state) on the basis of a pulse width modulation (PWM) signal from the ECU 100, which will be described below. In this case, the converter 30 applies the primary-side voltage VL to the battery 21.

The converter 30 executes a voltage increasing operation that converts the primary-side voltage VL to the secondary-side voltage VH when the second IGBT 35 is switched (repeatedly switched between an ON state and an OFF state) on the basis of the PWM signal from the ECU 100, which will be described below. In this case, the converter 30 applies the secondary-side voltage VH to the first inverter 40 and the second inverter 60. It should be noted that a power MOSFET or the like can be utilized instead of the IGBT in the converter 30.

The first inverter 40 includes paired input terminals (P4, N4). The paired input terminals (P4, N4) are respectively connected to the paired high-pressure-side terminals (P3, N3) of the converter 30. The first inverter 40 includes a U-phase leg, a V-phase leg, and a W-phase leg. These legs are each inserted between the paired input terminals (P4, N4) and are connected to each other in parallel.

The U-phase leg of the first inverter 40 includes an IGBT 41 and an IGBT 42. A diode 51 and a diode 52 are respectively connected to the IGBT 41 and the IGBT 42 in antiparallel. The IGBT 41 and the IGBT 42 are connected to each other in series such that an anode of the diode 51 and a cathode of the diode 52 are respectively connected thereto. A connection point between the IGBT 41 and the IGBT 42 is connected to a U-phase coil, which is not shown, of the first generator motor 81.

The V-phase leg of the first inverter 40 includes an IGBT 43 and an IGBT 44. A diode 53 and a diode 54 are respectively connected to the IGBT 43 and the IGBT 44 in antiparallel. The IGBT 43 and the IGBT 44 are connected to each other in series such that an anode of the diode 53 and a cathode of the diode 54 are respectively connected thereto. A connection point between the IGBT 43 and the IGBT 44 is connected to a V-phase coil, which is not shown, of the first generator motor 81.

The W-phase leg of the first inverter 40 includes an IGBT 45 and an IGBT 46. A diode 55 and a diode 56 are respectively connected to the IGBT 45 and the IGBT 46 in antiparallel. The IGBT 45 and the IGBT 46 are connected to each other in series such that an anode of the diode 55 and a cathode of the diode 56 are respectively connected thereto. A connection point between the IGBT 45 and the IGBT 46 is connected to a W-phase coil, which is not shown, of the first generator motor 81.

The second inverter 60 includes paired input terminals (P5, N5). The paired input terminals (P5, N5) are respectively connected to the paired high-pressure-side terminals (P3, N3) of the converter 30. The second inverter 60 includes a U-phase leg, a V-phase leg, and a W-phase leg. These legs are each inserted between the paired input terminals (P5, N5) and are connected to each other in parallel.

The U-phase leg of the second inverter 60 includes an IGBT 61 and an IGBT 62. A diode 71 and a diode 72 are respectively connected to the IGBT 61 and the IGBT 62 in antiparallel. The IGBT 61 and the IGBT 62 are connected to each other in series such that an anode of the diode 71 and a cathode of the diode 72 are respectively connected thereto. A connection point between the IGBT 61 and the IGBT 62 is connected to a U-phase coil, which is not shown, of the second generator motor 82.

The V-phase leg of the second inverter 60 includes an IGBT 63 and an IGBT 64. A diode 73 and a diode 74 are respectively connected to the IGBT 63 and the IGBT 64 in antiparallel. The IGBT 63 and the IGBT 64 are connected to each other in series such that an anode of the diode 73 and a cathode of the diode 74 are respectively connected thereto. A connection point between the IGBT 63 and the IGBT 64 is connected to a V-phase coil, which is not shown, of the second generator motor 82.

The W-phase leg of the second inverter 60 includes an IGBT 65 and an IGBT 66. A diode 75 and a diode 76 are respectively connected to the IGBT 65 and the IGBT 66 in antiparallel. The IGBT 65 and the IGBT 66 are connected to each other in series such that an anode of the diode 75 and a cathode of the diode 76 are respectively connected thereto. A connection point between the IGBT 65 and the IGBT 66 is connected to a W-phase coil, which is not shown, of the second generator motor 82.

It should also be noted that another switching element such as the power MOSFET can be utilized instead of the IGBT in the first inverter 40 and the second inverter 60.

The first inverter 40 and the second inverter 60 are controlled when each of these IGBTs are switched on the basis of the PWM signal from the ECU 100.

More specifically, the first inverter 40 converts DC power between the input terminals (P4, N4) to three-phase AC power when the IGBTs 41 to 46 are switched (repeatedly switched between ON states and OFF states) on the basis of the PWM signal from the ECU 100 in a first aspect. In this aspect, the first inverter 40 outputs a voltage of this three-phase AC power to the first generator motor 81 from a connection point between the two IGBTs in each of the legs of the U-phase, the V-phase, and the W-phase.

Furthermore, the first inverter 40 converts the three-phase AC power from the first generator motor 81 that is input from the connection point between the two IGBTs in each of the legs of the U-phase, the V-phase, and the W-phase to the DC power when the IGBTs 41 to 46 are switched (repeatedly switched between the ON states and the OFF states) on the basis of the PWM signal from the ECU 100 in a second aspect. In this aspect, the first inverter 40 outputs a voltage of this DC power as the secondary-side voltage VH to a position between the input terminals (P4, N4).

Similarly, the second inverter 60 converts the DC power between the input terminals (P5, N5) to the three-phase AC power when IGBTs 61 to 66 are switched (repeatedly switched between ON states and OFF states) on the basis of the PWM signal from the ECU 100 in the first aspect. In this aspect, the second inverter 60 outputs the voltage of this three-phase AC power to the second generator motor 82 from the connection point between the two IGBTs in each of the legs of the U-phase, the V-phase, and the W-phase.

Moreover, the second inverter 60 converts the three-phase AC power from the second generator motor 82 that is input from the connection point between the two IGBTs in each of the legs of the U-phase, the V-phase, and the W-phase to the DC power when the IGBTs 61 to 66 are switched (repeatedly switched between the ON states and the OFF states) on the basis of the PWM signal from the ECU 100 in the second aspect. In this aspect, the second inverter 60 outputs a voltage of this DC power as the secondary-side voltage VH to a position between the input terminals (P5, N5).

The first generator motor 81 and the second generator motor 82 each include: a rotor having a permanent magnet therein; and a stator around which a three-phase coil is wound. Each of the first generator motor 81 and the second generator motor 82 can be operated as a generator motor and can also be operated as a generator. The first generator motor 81 is primarily utilized as the generator and further cranks the internal combustion engine 83 at a start of the internal combustion engine 83. The second generator motor 82 is primarily utilized as the generator motor and generates drive power of the vehicle 10. It should be noted that the first generator motor 81 and the second generator motor 82 each include an unillustrated rotational position detection sensor that detects a rotational position and a signal from the rotational position detection sensor is sent to the ECU 100.

The internal combustion engine 83 is a gasoline fuel engine and generates torque when an intake air amount, a fuel injection amount, and the like are controlled by the ECU 100.

The power split mechanism 90 includes a planetary gear mechanism, converts torque from the internal combustion engine 83, the first generator motor 81, and the second generator motor 82, and outputs the torque to the differential gear 93 via the reduction mechanism 91 and the axle 92. The torque that is output to the differential gear 93 is transmitted to the drive wheels 94. It should be noted that the power split mechanism 90 and a control method therefor are well-known and are described in detail in Japanese Patent Application Publication No. 2009-126450 (JP 2009-126450 A) (US 2010/0241297 A), Japanese Patent Application Publication No. 9-308012 (JP 9-308012 A) (U.S. Pat. No. 6,131,680 filed on Mar. 10, 1997), and the like, which are incorporated herein by reference.

An auxiliary power storage device 96 is connected between the paired low-pressure-side terminals (P2, N2) of the converter 30 via a DC/DC converter 95. The power accumulated in the auxiliary power storage device 96 is utilized to operate the ECU 100 in addition to driving of electric equipment such as a front light, which is not shown.

The ECU 100 has a microcomputer including a CPU, a ROM, and a RAM as a main component. It should be noted that the ECU 100 may be constructed of a plurality electronic control units (ECUs), such as a ECU for controlling an overall system of the vehicle 10, an engine ECU for controlling the internal combustion engine 83, a MG ECU for controlling the first inverter 40, the second inverter 60, and the like, a battery ECU for executing monitoring and the like of the battery 21, and a brake ECU for controlling a braking device, which is not shown. These ECUs exchange information therebetween through a communication wire.

The ECU 100 can electrically connect or disconnect between the battery 21 and the converter 30 by sending a command to the relays SMR1, SMR2, and SMR3.

The ECU 100 obtains a travel speed of the vehicle 10, a depression amount of an accelerator pedal, a speed of the internal combustion engine 83, a rotational speed of the first generator motor 81, a rotational speed of the second generator motor 82, a state of charge (SOC) of the battery 21, the primary-side voltage VL measured by the first voltage sensor 22, the secondary-side voltage VH measured by the second voltage sensor 23, and the like.

It should be noted that the ECU 100 can selectively realize either one of an EV travel mode in which the vehicle 10 travels by actuating at least one of the first generator motor 81 and the second generator motor 82 in a state where the internal combustion engine 83 is stopped or an HV travel mode in which the vehicle 10 travels by actuating at least one of the internal combustion engine 83, the first generator motor 81, and the second generator motor 82. The ECU 100 determines which mode is selected for traveling on the basis of the SOC of the battery 21, a vehicle speed, the depression amount of the accelerator pedal, which is not shown, and the like.

Travel control of the hybrid vehicle by such an HV travel mode and such an EV travel mode is well-known and is described in detail in JP 2009-126450 A (US 2010/0241297 A), JP 9-308012 A (U.S. Pat. No. 6,131,680 filed on Mar. 10, 1997), and the like, which are incorporated herein by reference.

Figure 2A:
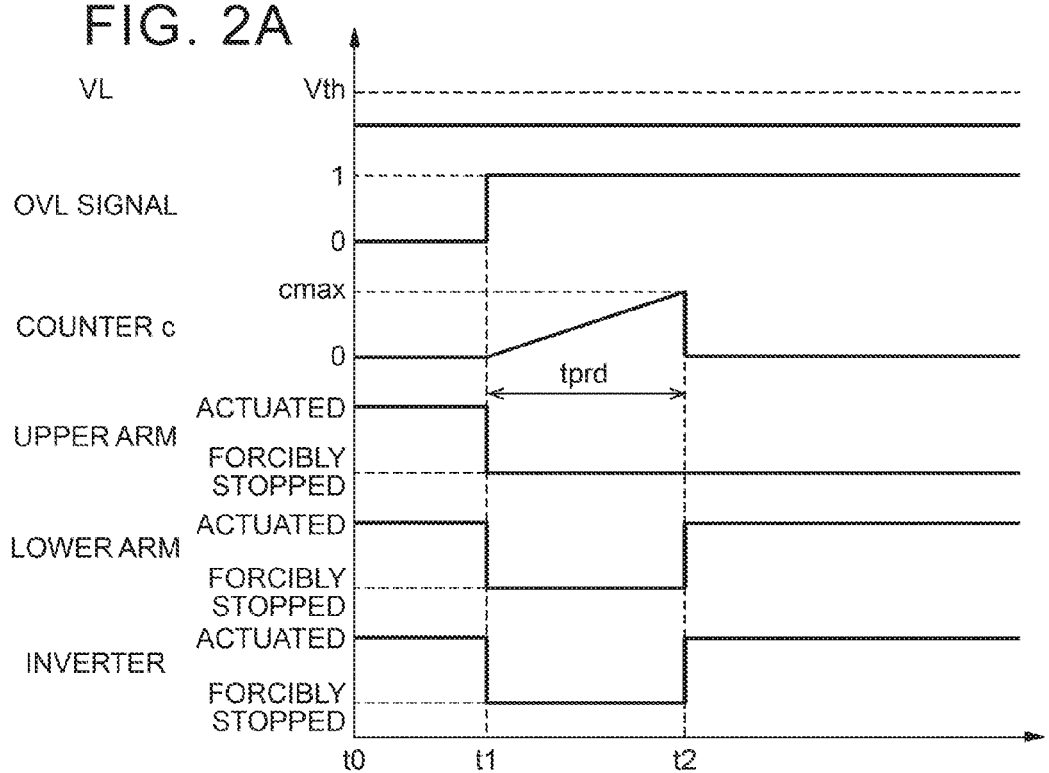
FIG. 2A is a time chart for explaining actuation of the power supply device shown in FIG. 1 when a value of a primary-side voltage is lower than a specified threshold.
Figure 2B:
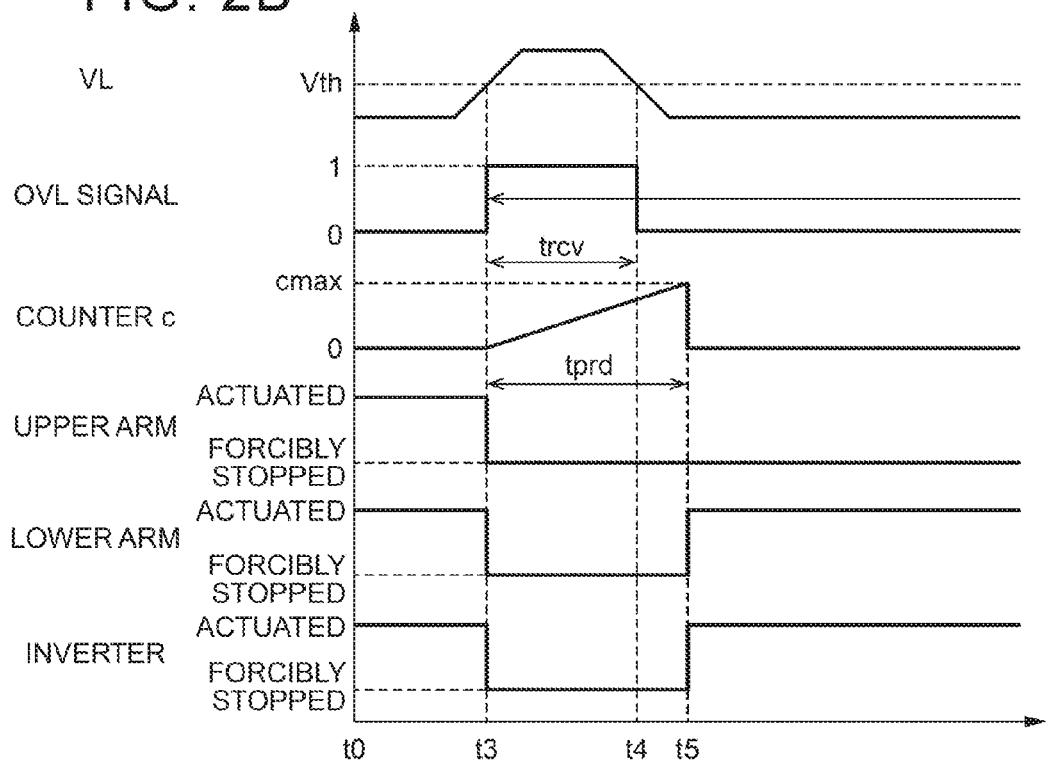
FIG. 2B is a time chart for explaining actuation of the power supply device shown in FIG. 1 when a value of a primary-side voltage exceeds and then falls below a specified threshold.

(Actuation) A description will hereinafter be made on actuation of the power supply device 11 with reference to FIGS. 2A and 2B. FIGS. 2A and 2B include time charts of the primary-side voltage (output of the first voltage sensor 22) VL, the OVL signal, a counter c, actuated—forcibly stopped states of the upper arm 30a of the converter 30, actuated—forcibly stopped states of the lower arm 30b of the converter 30, and actuated—forcibly stopped states of the first inverter 40. It should be noted that actuated—forcibly stopped states of the second inverter 60 are similar to those of the first inverter 40, and thus illustration and a description thereon will not be made.

The above "actuated state" refers to a state that will be defined below. In a case of the upper arm 30a of the converter 30: a state where the voltage lowering operation for lowering the secondary-side voltage VH by repeatedly switching a state of a switching element (the first IGBT 33) of the upper arm 30a between the ON state and the OFF state is performed. In a case of the lower arm 30b of the converter 30: a state where the voltage increasing operation for increasing the primary-side voltage VL that is applied from the battery 21 to the converter 30 by repeatedly switching a state of a switching element (the IGBT 35) of the lower arm 30b between the ON state and the OFF state is performed. In a case of the first inverter 40 (the second inverter 60): a state where the secondary-side voltage VH is converted to an AC voltage by repeatedly switching a state of each of switching elements (the IGBTs 41 to 46) of the plurality of legs between the ON state and the OFF state. Alternatively, a state where the AC power supplied from the first generator motor 81 (the second generator motor 82) is converted to the DC power by repeatedly switching the state of each of the IGBTs 41 to 46 between the ON state and the OFF state.

The above "forcibly stopped state" refers to a state that will be defined below. A state where the state of each of the switching elements in the converter 30 and the first inverter 40 (the second inverter 60) is constantly maintained to be the OFF state.

It should be noted that a "normal operation", which will be described below, refers to that all of the upper arm 30a and the lower arm 30b of the converter 30 and the first inverter 40 (the second inverter 60) are in the "actuated states". Furthermore, a "normal travel", which will be described below, refers to that the vehicle 10, in which the power supply device 11 is mounted, travels in a state where the power supply device 11 performs the "normal operation".

First, a case where the OVL signal is generated despite a state where a value of the primary-side voltage VL is lower than the specified threshold Vth will be described with reference to FIG. 2A. When no abnormality occurs in the power supply device 11 and the power supply device 11 performs the normal operation, the primary-side voltage VL is lower than the specified threshold Vth. This state corresponds to a state indicated at time t0 in FIG. 2A. That is, in the normal operation, all of the upper arm 30a and the lower arm 30b of the converter 30 and the first inverter 40 are in the "actuated states". As will be described below, the counter c starts to increment at a time point that the OVL signal is changed from "0" to "1", and continues to increment until a value thereof becomes cmax. It should be noted that a value of the counter c is set to "0" when the power supply device 11 performs the normal operation. The OVL signal indicates the value of "0" because the value of the primary-side voltage VL is lower than the specified threshold Vth.

In the case where the OVL signal is changed from "0" to "1" (time t1) due to failure of the overvoltage determination circuit 38 during the normal operation despite a fact that the value of the primary-side voltage VL indicates a lower value than the specified threshold, the value of the counter c is increased by "1" (starts increments). In addition, the upper arm 30a and the lower arm 30b of the converter 30 and the first inverter 40 are shifted from the "actuated states" to the "forcibly stopped states". As a result, power supply to the first generator motor 81 and the second generator motor 82 is stopped, and thus the first generator motor 81 and the second generator motor 82 can no longer generate the drive power of the vehicle.

At time t2 at which this state (that is, a state where the value of the counter c is incremented) continues for a specified time tprd, the value of the counter c reaches the threshold cmax. At this time, states of the lower arm 30b of the converter 30 and the first inverter 40 are shifted from the "forcibly stopped states" to the "actuated states". Meanwhile, the state of the upper arm 30a of the converter 30 is maintained to be the "forcibly stopped state". It should be noted that the value of the counter c is set to "0" after reaching the threshold cmax.

In this case, the power supply device 11 determines that "overvoltage abnormality" occurs in the converter 30 and shifts a travel mode of the vehicle to a "limp home mode".

Next, a case where an overvoltage is generated in a low-voltage-side circuit, the primary-side voltage VL thus exceeds the specified threshold Vth, and the primary-side voltage VL falls below the specified threshold Vth again (the primary-side voltage VL is resumed to a normal value) will be described with reference to FIG. 2B.

When no abnormality occurs in the power supply device 11 and the power supply device 11 performs the normal operation, the primary-side voltage VL is lower than the specified threshold Vth. This state corresponds to a state indicated at the time t0 in FIG. 2B. That is, in the normal operation, all of the upper arm 30a and the lower arm 30b of the converter 30 and the first inverter 40 are in the "actuated states".

In the case where the primary-side voltage VL that is detected by the first voltage sensor 22 starts being increased due to a certain reason and exceeds the specified threshold Vth at time t3 during the normal operation, the OVL signal is changed from "0" to "1", and the value of the counter c starts being increased by "1". In addition, the upper arm 30a and the lower arm 30b of the converter 30 and the first inverter 40 are shifted from the "actuated states" to the "forcibly stopped states".

In the case where the primary-side voltage VL starts being lowered due to a certain reason in this state and the primary-side voltage VL falls below the specified threshold Vth at time t4 (time before time t5), the OVL signal is changed from "1" to "0", and the states of the lower arm 30b of the converter 30 and the first inverter 40 are shifted from the "forcibly stopped states" to the "actuated states". Meanwhile, the state of the upper arm 30a of the converter 30 is maintained to be the "forcibly stopped state".

In this case, the power supply device 11 determines that the "overvoltage abnormality" occurs in the converter 30 and shifts the travel mode of the vehicle to the "the limp home mode". It should be noted that a time from a time point at which the primary-side voltage VL exceeds the specified threshold Vth to a time point at which the primary-side voltage VL falls below the specified threshold Vth again is referred to as a restoration time trcv.

As described above, the power supply device 11 allows a limp home mode travel of the vehicle in a state where the voltage increasing operation of the converter 30 can be performed. As a result, according to this power supply device, the vehicle can travel in the limp home mode with the high drive power. It should be noted that, also in the above limp home mode, the magnitudes of the torque generated by the first generator motor 81 and the second generator motor 82 are changed in accordance with the depression amount of the accelerator pedal, which is not shown, by a well-known control method.

Next, specific actuation of the power supply device 11 will be described with reference to FIG. 3. FIG. 3 shows a "travel mode determination routine" executed by the CPU of the ECU 100.

A description will hereinafter be made for each of (A) a case during the normal travel (the overvoltage is not generated), (B) a case where the OVL signal is changed from "0" to "1" during the normal travel, and (C) a case during the limp home mode travel. In the following description, a forcible stop flag Xstop is a flag, a value of which is set to "1" when all of the upper arm 30a and the lower arm 30b of the converter 30 and the inverters (the first inverter 40 and the second inverter 60) are in the forcibly stopped states, and the value of which is set to "0" for the rest of time.

In the case during the normal travel, the CPU of the ECU 100 executes the "travel mode determination routine" shown in FIG. 3 every time a specified time elapses. Accordingly, the CPU of the ECU 100 initiates the process from step 300 in FIG. 3 at appropriate timing. Then, the process proceeds to step 310, and the CPU of the ECU 100 determines whether the vehicle, to which this power supply device is applied, is traveling in the limp home mode. In detail, the CPU of the ECU 100 determines whether the state that the vehicle does not travel in the limp home mode is satisfied. According to the above-described assumption, the vehicle is not traveling in the limp home mode. Thus, the CPU of the ECU 100 determines "Yes" in step 310. Then, the process proceeds to step 320, and the CPU of the ECU 100 determines whether the OVL signal has been changed from "0" to "1".

At a current time point, the OVL signal remains "0". That is, the OVL signal is not changed from "0" to "1". Accordingly, the CPU of the ECU 100 determines "No" in step 320. Then, the process proceeds to step 370, and the CPU of the ECU 100 determines whether a value of the forcible stop flag Xstop is "1". At a current time point, the upper arm 30a and the lower arm 30b of the converter 30 and the inverters (the first inverter 40 and the second inverter 60) are not in the forcibly stopped states. Thus, the value of the forcible stop flag Xstop is "0". Accordingly, the CPU of the ECU 100 determines "No" in step 370. Then, the process proceeds to step 380, and the CPU sets the value of the counter c to "0". The process skips to step 395, and this routine is terminated once. That is, the normal travel of the vehicle 10 continues.

In the case where the OVL signal is changed from "0" to "1" during the normal travel, the CPU of the ECU 100 initiates the process from step 300 in FIG. 3 at appropriate timing and determines "Yes" in step 310. Then, the process proceeds to step 320.

According to the above-described assumption, the OVL signal is changed from "0" to "1" at a current time point. Accordingly, the CPU of the ECU 100 determines "Yes" in step 320, and the process proceeds to step 330. Then, the CPU of the ECU 100 brings the upper arm 30a and the lower arm 30b of the converter 30 and the inverters (the first inverter 40 and the second inverter 60) into the "forcibly stopped states" and sets the value of the forcible stop flag Xstop to "1".

Thereafter, the process proceeds to step 340. The CPU of the ECU 100 sets the value of the counter c to "1", and the process proceeds to step 350. Then, the CPU of the ECU 100 determines whether the value of the counter c is at least equal to the specified value cmax (the specified time tprd). At a current time point, the value of the counter c is set to "1" and has not reached the specified value cmax (has not reached the specified time tprd). Thus, the CPU of the ECU 100 determines "No" in step 350. Then, the process skips to 395, and this routine is terminated once.

Thereafter, the CPU of the ECU 100 executes the routine that is shown in FIG. 3 again at appropriate timing. That is, the CPU of the ECU 100 initiates the process from step 300 again at specified timing and determines "Yes" in step 310, and the process proceeds to step 320. Then, the CPU of the ECU 100 determines "No", and the process proceeds to step 370. At a current time point, the value of the forcible stop flag Xstop is "1". Accordingly, the CPU of the ECU 100 determines "Yes" in step 370, and the process proceeds to step 340. Then, CPU of the ECU 100 sets the value of the counter c to "2", and the process proceeds to step 350. At a current time point, the value of the counter c is set to "2" and thus is smaller than the specified value cmax. Thus, the CPU of the ECU 100 determines "No" in step 350, and the process skips to 395. Then, this routine is terminated once.

As it is understood from the above, the CPU of the ECU 100 repeatedly executes the processes in step 300 to step 320, step 370, step 340 to step 350, and step 395 in a period in which the value of the counter c does not become at least equal to the specified value cmax. Accordingly, the value of the counter c is increased by "1" at appropriate timing and later becomes at least equal to the specified value cmax.

In the case where the value of the counter c becomes at least equal to the specified value cmax, the CPU of the ECU 100 determines "Yes" in step 350 when the process proceeds to step 350. Then, the process proceeds to 360, and the CPU of the ECU 100 maintains the upper arm 30a of the converter 30 in the "forcibly stopped state" and shifts the lower arm 30b of the converter 30 and the inverters 40 and 60 to the "actuated states". Furthermore, the CPU of the ECU 100 sets the value of the counter c to "0" in step 360 and sets the value of the forcible stop flag Xstop to "0". Then, the process proceeds to step 395, and this routine is terminated once.

That is, the CPU of the ECU 100 shifts the vehicle 10 to the "limp home mode" in step 360. As described above, only the switching element of the upper arm 30a of the converter 30 is forcibly stopped, and the switching element of the lower arm 30b is actuated in the "limp home mode". Accordingly, the converter 30 can perform the voltage increasing operation. Thus, this power supply device allows the vehicle 10 to travel in the limp home mode at the secondary-side voltage that is equivalent to the voltage in the normal travel state. It should be noted that the CPU of the ECU 100 may turn on a warning lamp in a vehicle cabin and write that "the overvoltage is generated in the low-voltage-side circuit" in a backup RAM.

In the case during the limp home mode travel, the CPU of the ECU 100 initiates the process from step 300 in FIG. 3 at appropriate timing, and the process proceeds to step 310. The CPU of the ECU 100 determines "No", and the process skips to step 395. Then, this routine is terminated once. That is, the vehicle 10 continues to travel in the limp home mode.

As it has been described so far, according to the power supply device according to the embodiment of the present specification, in the case where a state where the overvoltage is determined to be possibly generated in the low-voltage-side circuit continues for a specified time or longer, it is determined that the upper arm of the converter has failed. Then, only the switching element of the upper arm of the converter is forcibly stopped. As a result, the voltage increasing operation of the converter can be performed even in the limp home mode. Thus, the vehicle can travel in the limp home mode with the high drive power.

When the overvoltage determination circuit 38 determines that the primary-side voltage VL becomes at least equal to the specified threshold Vth, the ECU 100 of the power supply device according to the embodiment of the present specification maintains the states of all of the switching elements of the converter 30 and the states of all of the switching elements of the inverters 40, 60 to be the OFF states. Then, when the overvoltage determination circuit 38 determines that a state where the primary-side voltage VL is at least equal to the specified threshold Vth continues for the specified time tprd or longer, the ECU 100 causes the converter 30 to perform the voltage increasing operation by repeatedly switching the state of the lower arm 30b of the converter 30 between the ON state and the OFF state while maintaining the state of the switching element of the upper arm 30a of the converter 30 to be the OFF state. In addition, the ECU 100 causes the converter 30 to convert the secondary-side voltage VH to the AC voltage by repeatedly switching each of the states of the switching elements of the plurality of legs in the inverters 40, 60 between the ON state and the OFF state and apply the AC voltage to the generator motors 81, 82. In this way, the vehicle can travel in the limp home mode with the high drive power can be made.

The primary-side voltage of the converter is brought into a state of the overvoltage only when the upper arm of the converter fails or the system main relay fails. Accordingly, the primary-side voltage is not brought into the state of the overvoltage when the lower arm of the converter fails. Thus, the lower arm of the converter can be operated, and the voltage increasing operation can be executed.

The power supply device of the present specification that has been made on the basis of such findings is applied to the vehicle in which the generator motor is mounted as the drive source for generating the drive power of the vehicle, and includes the battery that can be charged and discharged, the converter, the overvoltage determination circuit, the inverters, and the ECU.

The converter has: the upper arm that includes the switching element; and the lower arm that is connected to the upper arm in series and includes the switching element. The converter performs a "voltage converting operation" in which the primary-side voltage that is applied to the converter from the battery is increased, and the increased voltage is applied as the secondary-side voltage to the inverters when the ECU repeatedly switches the state of the switching element of the lower arm between the ON state and the OFF state.

The overvoltage determination circuit is configured to determine whether the primary-side voltage is at least equal to the specified threshold.

The inverter includes the plurality of legs, each of which includes the upper arm having the switching element and the lower arm having the switching element connected to the upper arm in series. The inverter performs a "DC-AC converting operation" in which the secondary-side voltage is converted to the AC voltage and the AC voltage is applied to the generator motor when the ECU repeatedly switches each of the states of the switching elements of the plurality of legs between the ON state and the OFF state.

The ECU causes the converter to perform the "voltage converting operation", causes the inverter to perform the "DC-AC converting operation", and maintains the states of all of the switching elements of the converter and the states of all of the switching elements of the inverter to be the OFF states when the overvoltage determination circuit determines that the primary-side voltage becomes at least equal to the specified threshold. That is, each of the arms of the converter and the switching element of each of the legs of the inverter are all shut down, and the above voltage converting operation and the above DC-AC converting operation are stopped.

Thereafter, in the case where the overvoltage determination circuit determines that the state where the primary-side voltage is at least equal to the specified threshold continues for the specified time or longer, the ECU is configured to increase the primary-side voltage and apply the increased voltage as the secondary-side voltage to the inverter by repeatedly switching the state of the switching element of the lower arm of the converter between the ON state and the OFF state while maintaining the state of the switching element of the upper arm of the converter to be the OFF state, and is configured to convert the secondary-side voltage to the AC voltage and apply the AC voltage to the generator motor by repeatedly switching each of the states of the switching elements of the plurality of legs in the inverter between the ON states and the OFF states.

As described above, when the state of the overvoltage of the primary-side voltage continues for the specified time or longer, only the upper arm of the converter fails in the power supply device (the converter and the inverters), and the lower arm can be actuated. That is, in this case, the converter does not hinder a function of the voltage increasing operation. Thus, the ECU maintains the OFF state of (continuously shuts down) the switching element of the upper arm of the converter only, and causes the switching element of the lower arm of the converter to perform the voltage increasing operation. As a result, the voltage increasing operation of the converter and the DC-AC converting operation of the inverter can be performed even in the limp home mode, and the equivalent voltage to that during the normal travel can be applied to the load device (the generator motor). Therefore, the vehicle can travel in the limp home mode with the high drive power.

The present specification is not limited to the above embodiment, and various modifications can be adopted within the scope of the present specification.

As described above, this embodiment is not limited to application to the hybrid vehicle, and can also be applied to the vehicle that has the generator motor as the generation source (the drive source) of the vehicle drive power. For example, this embodiment can also be applied to an electric vehicle and a fuel cell vehicle.

What is claimed is:

1. A power supply device applied to a vehicle in which a generator motor is mounted as a drive source for generating drive power of the vehicle, the power supply device comprising:

a battery that can be charged and discharged;

an inverter having a plurality of legs, each of which includes an upper arm having a third switching element and a lower arm connected to the upper arm in series and having a fourth switching element, the inverter performs a DC-AC converting operation that converts a secondary-side voltage to an AC voltage and applying the AC voltage to the generator motor when a state of each of the third switching element and the fourth switching element is repeatedly switched between an ON state and an OFF state;

a converter including an upper arm having a first switching element and a lower arm connected to the upper arm in series and having a second switching element, the converter performs a voltage converting operation that increases a primary-side voltage to be applied to the converter from the battery and applying an increased voltage as the secondary-side voltage to the inverter when a state of the second switching element is repeatedly switched between an ON state and an OFF state;

an overvoltage determination circuit that determines whether the primary-side voltage is at least equal to a specified threshold; and an electronic control unit configured to cause the converter to perform the voltage converting operation and cause the inverter to perform the DC-AC converting operation, the electronic control unit configured to maintain the states of all of the first switching element, the second switching element, the third switching element, and the fourth switching element to be the OFF state when the overvoltage determination circuit determines that the primary-side voltage becomes at least equal to the specified threshold, and the electronic control unit configured to perform i) and ii) when the overvoltage determination circuit determines that a state where the primary-side voltage is at least equal to the specified threshold continues for a specified time or longer, i) increase the primary-side voltage by repeatedly switching the state of the second switching element between the ON state and the OFF state while maintaining the state of the first switching element to be the OFF state, and apply the increased voltage as the secondary-side voltage to the inverter, and ii) convert the secondary-side voltage to the AC voltage by repeatedly switching each of the states of the third switching element and the fourth switching element between the ON state and the OFF state, and apply the AC voltage to the generator motor.

2. The power supply device of claim 1, wherein the battery is formed of a plurality of secondary batteries that can be charged and discharged.

3. The power supply device of claim 1, wherein the converter includes paired high-pressure-side terminals and the inverter includes paired input terminals, and wherein the paired input terminals of the inverter are respectively connected to the paired-high-pressure-side terminals of the converter.

4. The power supply device of claim 1, wherein the plurality of legs of the inverter are connected to each other in parallel.

5. The power supply device of claim 1, wherein the third switching element and the fourth switching element of the inverter are insulated-gate bipolar transistors.

6. The power supply device of claim 1, wherein the first switching element and the second switching element of the converter are insulated-gate bipolar transistors.

* * * * *